(12) United States Patent
Hamberger et al.

(10) Patent No.: US 11,914,070 B2
(45) Date of Patent: Feb. 27, 2024

(54) RADAR TARGET SIMULATOR FRONT END AND METHOD FOR SIMULATING

(71) Applicant: Rohde & Schwarz GmbH & Co. KG, Munich (DE)

(72) Inventors: Gerhard Hamberger, Griesstaett (DE); Matthias Beer, Neubiberg (DE); Steffen Neidhardt, Dorfen (DE); Maximilian Bogner, Munich (DE); Benedikt Simper, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 375 days.

(21) Appl. No.: 16/888,056

(22) Filed: May 29, 2020

(65) Prior Publication Data

US 2021/0373122 A1   Dec. 2, 2021

(51) Int. Cl.
*G01S 7/40* (2006.01)

(52) U.S. Cl.
CPC .............. *G01S 7/4052* (2013.01); *G01S 7/40* (2013.01); *G01S 7/4082* (2021.05)

(58) Field of Classification Search
CPC ......... G01S 7/4052; G01S 7/40; G01S 7/4082
See application file for complete search history.

(56) References Cited

U.S. PATENT DOCUMENTS

| | | | | |
|---|---|---|---|---|
| 4,660,041 A | * | 4/1987 | Maples | G01S 7/40 342/170 |
| 9,151,828 B2 | * | 10/2015 | Shipley | H01Q 21/225 |
| 11,105,910 B2 | * | 8/2021 | Hong | G01S 7/42 |
| 2012/0274499 A1 | | 11/2012 | Chang | |
| 2018/0246204 A1 | | 8/2018 | Ding et al. | |
| 2020/0033445 A1 | | 1/2020 | Raphaeli et al. | |

FOREIGN PATENT DOCUMENTS

| | | |
|---|---|---|
| CN | 102043143 A | 5/2011 |
| CN | 104459685 A | 3/2015 |
| CN | 104614726 A | 5/2015 |
| CN | 105353367 A | 2/2016 |
| CN | 105842674 A | 8/2016 |
| CN | 106291540 A | 1/2017 |

(Continued)

OTHER PUBLICATIONS

LeFevre et al, "Smart Repeater for Radar Testing," 1998 IEEE AUTOTESTCON Proceedings. IEEE Systems Readiness Technology Conference. Test Technology for the 21st Century (Cat. No. 98CH36179), 1998, pp. 611-614, doi: 10.1109/AUTEST.1998.713506.

(Continued)

*Primary Examiner* — Peter M Bythrow
*Assistant Examiner* — Nazra Nur Waheed
(74) *Attorney, Agent, or Firm* — DITTHAVONG, STEINER & MLOTKOWSKI (57) ABSTRACT

A radar target simulator front end, configured to simulate at least one radar target for testing a radar device under test is provided. The radar target simulator front end comprises at least two antenna units, arranged along a first angle under investigation. The at least two antenna units are configured to be selectively activated and deactivated. Whereby each antenna unit of the at least two antenna units generates a simulated radar target along the first angle under investigation, when activated.

16 Claims, 4 Drawing Sheets (56) References Cited

FOREIGN PATENT DOCUMENTS

| | | | |
|---|---|---|---|
| CN | 106443615 | A | 2/2017 |
| CZ | 201945 | A3 * | 1/2019 |
| DE | 102014208899 | A1 | 11/2015 |
| EP | 1034442 | A1 | 9/2000 |
| EP | 3143712 | A1 | 3/2017 |
| EP | 3588128 | A1 | 1/2020 |
| FR | 3071346 | A1 | 3/2019 |
| FR | 3071346 | A1 * | 3/2019 |
| IN | 105093201 | A | 11/2015 |
| NO | 1999027383 | A1 | 6/1999 |
| WO | 2015172907 | A1 | 11/2015 |
| WO | 2019242913 | A1 | 12/2019 |

OTHER PUBLICATIONS

Office Action for related European Patent Application No. 21153376.5-1206, dated Jul. 8, 2021, 8 pages.

* cited by examiner

RADAR TARGET SIMULATOR FRONT END AND METHOD FOR SIMULATING

TECHNICAL FIELD

The invention relates to testing radar devices, especially testing road vehicle radar devices, and a respective method for simulating a radar target.

BACKGROUND ART

Road vehicle radar devices serve the purpose of detecting objects surrounding the vehicle. In order to test such a radar device, the ability of the device to detect objects under controlled conditions needs to be verified. Conventional test setups use actual target objects, which are placed in the vicinity of the radar device under test and which are actively moved with regard to the radar device under test to simulate movement of a real-world object.

For example, the document EP 3 143 712 B1 shows such a conventional radar test system. Such a setup can produce accurate results, but is large and cumbersome and therefore only usable in a development environment, but not in a production test environment.

Accordingly, there is a need to provide a radar target simulator front end and a method for simulating, which allow for testing a radar device under test with minimal hardware effort and minimal space requirement.

SUMMARY OF THE INVENTION

According to a first aspect of the invention, a radar target simulator front end, configured to simulate at least one radar target for testing a radar device under test is provided. The radar target simulator front end comprises at least two antenna units, arranged along a first angle under investigation. The at least two antenna units are configured to be selectively activated and deactivated. Whereby each antenna unit of the at least two antenna units generates a simulated radar target along the first angle under investigation, when activated. This allows for simulating a radar target at two different positions with regard to the radar device under test without actually performing any physical movement within the system.

Advantageously and preferably, each of the at least two antenna units comprises a transmission antenna and a reception antenna. This allows for a high signal separation and thereby increases the quality of the radar signal received by the radar device under test.

Preferably, the transmission antenna and the reception antenna of each of the at least two antenna units are arranged with regard to each other along an angle orthogonal to the first angle under investigation. This allows for reducing the size of the antenna unit along the angle under investigation, which in turn allows for spacing a plurality of antenna units close together along the angle under investigation, increasing the angular resolution that can be tested.

Advantageously and preferably, the transmission antenna and the reception antenna of each antenna unit are arranged at an angular distance with regard to each other, which is smaller than an angular resolution of the radar device under test. This results in the radar device under test not being able to distinguish the positions of the transmission antenna and the reception antenna, giving the radar device under test the impression of actually measuring a radar reflection of a real-world radar target.

Alternatively and preferably, each of the at least two antenna units comprises a combined transmission/reception antenna. This reduces the overall size of the antenna unit and at the same time assures that the radar device under test receives radar signals, which are very close to scattered signals of a real-world radar object.

Advantageously and preferably, the at least two antenna units are configured to be activated jointly, simulating generating at least two simulated radar targets. This allows for performing more complex tests.

Preferably, the radar target simulator front end is configured to simulate a near-field radar target by jointly activating at least two adjacent antenna units of the at least two antenna units. This allows for an increase in the radar target simulation flexibility.

Advantageously and preferably, the radar target simulator front end comprises a plurality of antenna units arranged along the first angle under investigation. The plurality of antenna units is configured to be selectively activated and deactivated, each antenna unit of the plurality of antenna units generating a simulated radar target, when activated. This allows for a very high angular resolution and the simulation of smooth movement of a radar target along the first angle under investigation.

Preferably, the radar target simulator front end moreover comprises at least two further antenna units arranged along a second angle under investigation. The at least two further antenna units are configured to be selectively activated and deactivated, each antenna unit of the at least two further antenna units generating a simulated radar target along the second angle under investigation, when activated. This allows for performing measurements along a second angle under investigation.

Preferably, the first angle under investigation and the second angle under investigation are orthogonal with regard to each other. This allows for measuring radar targets for example along an azimuth and along an elevation.

Preferably, the radar target simulator front end is configured to simulate radar targets for testing a multiple-input multiple output, MIMO, radar device under test and/or a multiple-input single-output, MISO, radar device under test. This allows for a very flexible use of the inventive radar target simulator front end.

Advantageously and preferably, the radar target simulator front end moreover comprises a plurality of antenna units, arranged in a two-dimensional angular pattern. The plurality of antenna units is configured to be selectively activated and deactivated, each antenna unit of the plurality of antenna units generating a simulated radar target at a specific two-dimensional angular position.

This allows for placing simulated radar targets as pixels in a two-dimensional grid, resulting in a very high measuring flexibility.

Preferably, the radar target simulator front end moreover comprises an antenna unit switch, which is configured to selectively activate and deactivate the at least two antenna units. This makes a high degree of automation possible.

Preferably, the antenna unit switch is configured to successively activate and deactivate adjacent antenna units of the at least two antenna units, simulating a movement of a simulated radar target. This allows for a very simple measuring setup.

According to a second aspect of the invention, a method for simulating at least one radar target for testing a radar device under test is provided. The method comprises providing at least two antenna units, arranged along a first angle under investigation, selectively activating and deactivating antenna units of the at least two antenna units, and thereby generating a simulated radar target along the first angle under investigation, when activated.

Preferably, many pairs of antenna units are created in an angle in order to simulate many possible angles under investigation.

Preferably, the pairs of antenna units are aligned in a specific direction in order to test radar targets along angles in the specific direction.

Preferably, the pairs of antenna units are designed to be within an angular resolution cell.

Preferably, a two-dimensional alignment of the antenna units is performed by creating pixels.

Preferably, a near field target is simulated.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
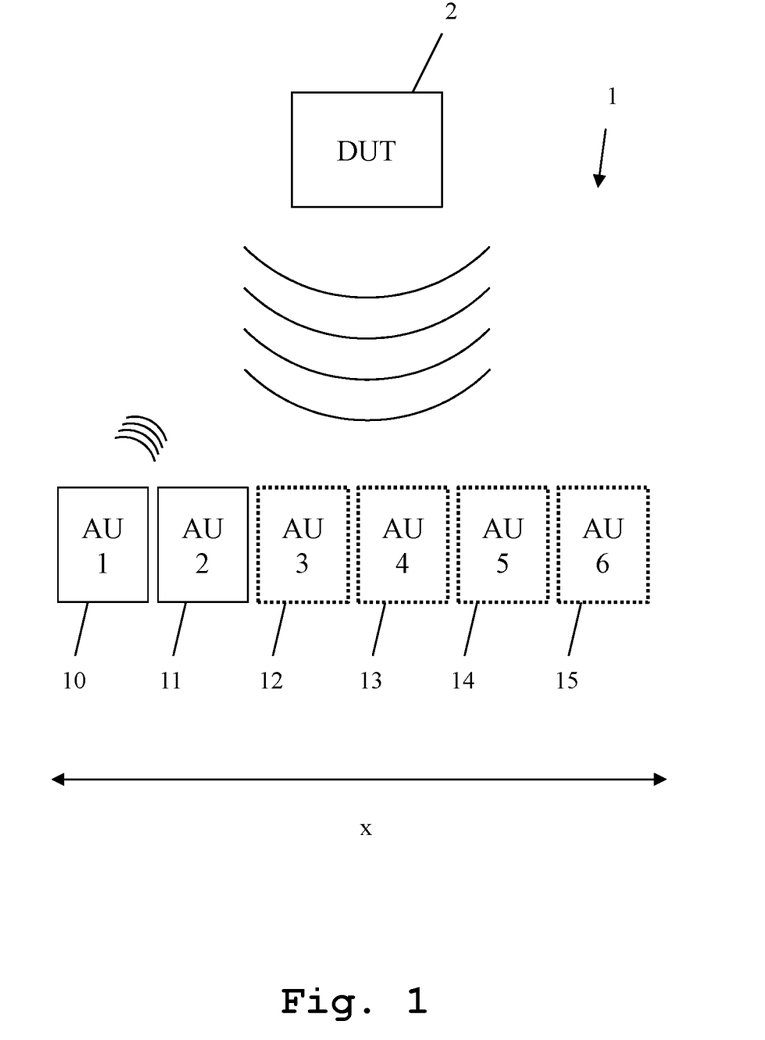
FIG. 1 shows a first exemplary embodiment of the inventive radar target simulator front end.

First, we demonstrate the general concept and function of the invention along FIG. 1. With regard to FIG. 2-FIG. 4, further details of the invention are explained along different embodiments of the device. Finally, with regard to FIG. 5, the detailed function of an embodiment of the inventive method is described. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the inventive radar target simulator front end 1 and a radar device under test 2 are shown. The radar device under test 2 is a multiple-input multiple output, MIMO, radar device or a multiple-input single-output, MISO, radar device under test. Even a single-input single-output, SISO, radar device under test can be tested with this setup.

Here, the radar target simulator front end 1 comprises a number of antenna units 10, 11, 12, 13, 14 and 15, arranged along a first angle under investigation x with regard to a radar device under test 2. Here, the antenna units 12-15 are shown using dotted lines, indicating that they constitute optional components. Each of the antenna units 10-15 is configured to be selectively activated and deactivated. In the activated state, the individual antenna unit 10-15 generates a radar reflection, while in the deactivated state, the antenna unit 10-15 does not generate a radar reflection.

During a test, the radar device under test 2 transmits a radar signal towards the radar target simulator front end 1. All active antenna units 10-15 generate a simulated scatter signal and transmit it back to the radar device under test 2. In FIG. 1, only the antenna unit 10 is active, resulting in only the antenna unit 10 generating a simulated scatter signal and returning it to the radar device under test 2. Therefore, the antenna unit 10 simulates a real-world radar target at its position.

With regard to the inner workings of the antenna units 10-15 it is referred to FIG. 2 and FIG. 3, which are explained later with regard to the second and third embodiment but works similar here.

For simulating a movement of a real-world radar target along the first angle under investigation x, the antenna units 10-15 can be activated and deactivated successively. For example, in a first instance, only the antenna unit 10 is active. In a second instance, the antenna unit 10 might be deactivated, while the antenna unit 11 is activated. In a third instance, the antenna unit 11 might be deactivated, while the antenna unit 12 is activated. This simulates a movement of the simulated radar target along the first angle under investigation x.

It is also possible to jointly activate and deactivate at least two of the antenna units 10-15 in order to simulate a larger radar target, or in order to simulate near-field conditions.

Preferably, the antenna units 10-15 are configured to simulate radar targets when activated, for a radar frequency of 50-130 GHz, preferably 70-90 GHz, most preferably 76-81 GHz.

Although here only six antenna units 10-15 are displayed, a far greater number of antenna units can be employed. For example, the number of antenna units arranged along the first angle of angle under investigation x might be between 50 and 150 antenna units, preferably 96 antenna units.

Also, only two antenna units may be used. This still allows a digital movement between two angular positions.

Second Embodiment

Figure 2:
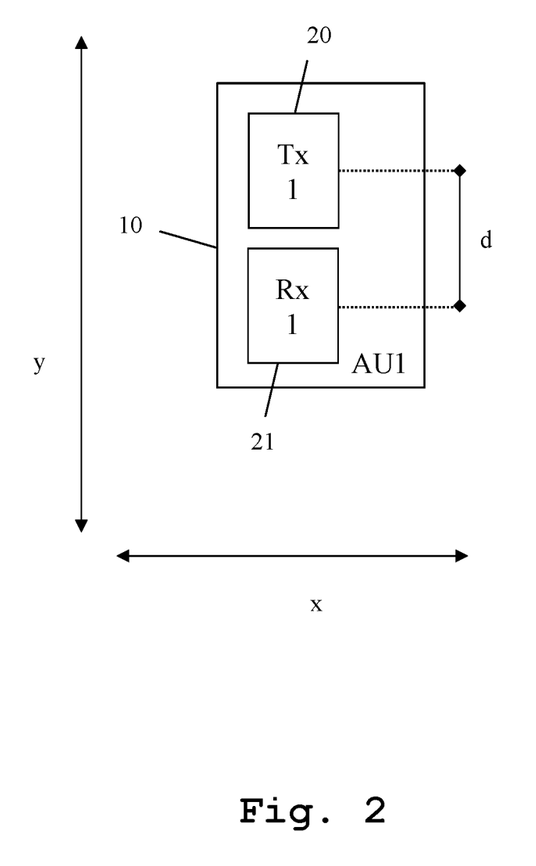
FIG. 2 shows a detail view of a second exemplary embodiment of the inventive radar target simulator front end.

In FIG. 2, a detail view of a second embodiment of the inventive radar target simulator front end is shown. Here, only a single antenna unit 10 is shown. The antenna unit 10 here comprises a transmission antenna 20 and a reception antenna 21. The transmission antenna 20 is configured to receive the radar signal transmitted by the radar device under test 2, while the reception antenna 21 is configured to transmit a simulated scatter signal back to the radar device under test 2.

In a most simple configuration, the activation and deactivation of the antenna unit 10 is performed by connecting the transmission antenna 20 to the reception antenna 21, and the deactivation is performed by opening the connection between these two antennas 20, 21.

In a more complex setup, the radar target simulator front end 1 is connected to a target simulator back end, not shown here. The backend is then configured to process the radar signal received by the reception antenna 21, and therefrom generate a simulated scatter signal, which is then handed to the transmission antenna 20, to be transmitted towards the radar device under test 2.

Especially, the target simulator back end then may comprise a down-converter, configured to perform a down-conversion of the radar signal received by the reception antenna 21 to the baseband region.

The target simulator back end may moreover comprise a baseband processor, configured to add fading, and/or dampening, and/or attenuation, and/or multi-path transmission, and/or noise.

The target simulator back end may moreover comprise an up-converter, configured to generate the simulated scatter signal, by up-converting the down-converted radar signal received by the reception antenna 21, or by up-converting the processed signal provided by the baseband processor.

Especially, a separate target simulator, such as for example the R&S AREG may be used as the target simulator back end.

In FIG. 2, additionally, the first angle under investigation x, and a second angle y, orthogonal to the first angle under investigation x is displayed.

Preferably, the transmission antenna 20 and the reception antenna 21 are arranged with regard to each other along the angle y, orthogonal to the first angle under investigation x. This allows for constructing the antenna unit 10 with a very small dimension along the first angle under investigation x, allowing for placing a very high number of antenna units along the first angle under investigation, achieving a high angular resolution.

The transmission antenna 20 and the reception antenna 21 are placed at an angular distance d of their centers with regard to each other. This angular distance is smaller than an angular resolution of the radar device under test. This prevents phase errors in case of the use of MIMO radar devices under test.

Preferably, the distance d of the centers of the antennas is between 1 mm and 10 mm, more preferably between 2 mm and 5 mm, most preferably 3 mm.

At a distance of 1-2 m between the radar simulator front end 1 and the radar device under test 2, preferably, an angular resolution of 0.02-1°, more preferably 0.05-0.5°, most preferably 0.1° is achieved.

Third Embodiment

Figure 3:
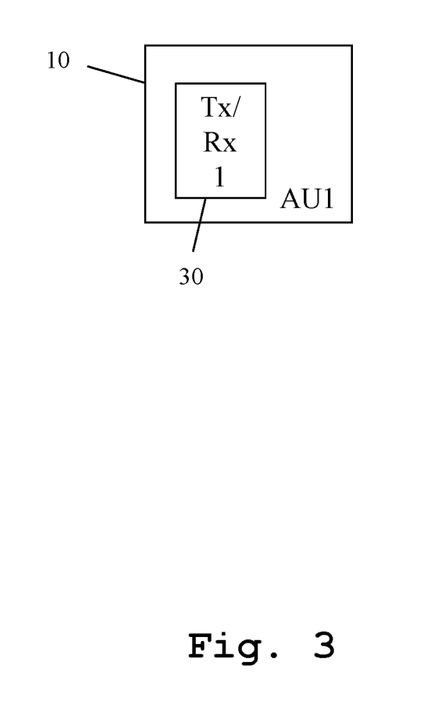
FIG. 3 shows a detail view of a third exemplary embodiment of the inventive radar target simulator front end.

In FIG. 3, a further detail view of an embodiment of the inventive radar target simulator front end is shown. Here, the inner workings of a single antenna unit 10 are shown. The antenna unit 10 here comprises a combined transmission/reception antenna 30. The transmission/reception antenna 30 is both used for receiving the radar signal transmitted by the radar device under test 2, as well as transmitting the simulated scatter signal to the radar device under test 2.

In a most simple construction, the deactivation of the transmission/reception antenna 30 can be achieved by opening a switch connecting different parts of the antenna, significantly altering the frequency response of the antenna, thereby significantly reducing the magnitude of the reflected radar signal. The activation in this case occurs by closing this connection again.

In a more complex setup, as described along FIG. 2, the radar signal received by the transmission/reception antenna 30 is handed to the radar target simulator back end, processed thereby, and a signal for transmission is handed back to the transmission/reception antenna 30. The only difference to the setup described along FIG. 2 is that the signal is received and transmitted successively by the same transmission/reception antenna 30 instead of being received by a dedicated reception antenna and then transmitted by a dedicated transmission antenna.

In practice, a number of antenna units may be grouped into an antenna modules, also referred to as QAT modules. Each antenna module comprises at least 4 antenna units. In case of the embodiment of FIG. 2, the antenna module then comprises 4 transmission antennas and 4 reception antennas. In case of the embodiment of FIG. 3, the antenna unit then comprises 4 joint antennas.

Each of the antenna units may be constructed as a single integrated circuit on a single microchip.

The antenna units can then be activated separately or jointly.

The antenna modules may moreover comprise signal distribution hardware, configured to distribute the signals received by the individual antennas to the radar simulator back end and to distribute the signals provided by the radar simulator back end to the individual antennas.

Also, the antenna modules may moreover comprise a state machine for controlling the individual antennas.

The antenna modules may furthermore comprise an interface, configured to connect and/or synchronize at least two antenna modules. Especially, a cascading and/or daisy chaining of antenna modules may be performed by this interface.

The radar simulator back end for example comprises 4 microwave sources and/or up to 8 signal conditioning units for transmission paths, and/or 10 signal conditioning units for reception paths, configured to perform the afore-mentioned processing.

The radar simulator back end may furthermore comprise a communication unit, configured to perform communication with the radar simulator front end 1.

Fourth Embodiment

Figure 4:
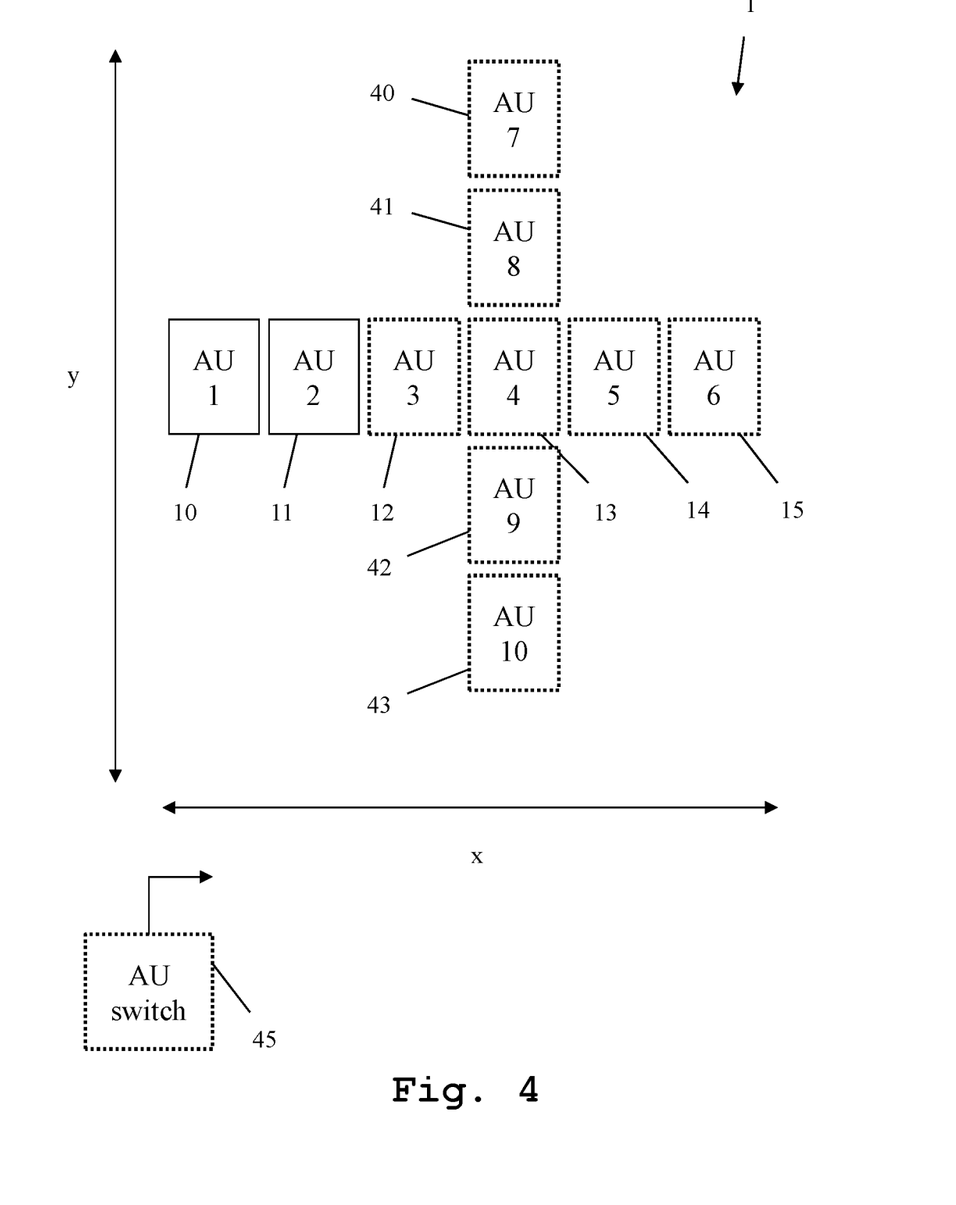
FIG. 4 shows a fourth exemplary embodiment of the inventive radar target simulator front end.

In FIG. 4, a further embodiment of the inventive radar target simulator front end 1 is shown. Here, in addition to the antenna units 10-15 arranged along the first angle under investigation x, further antenna units 40, 41, 42 and 43 are arranged along a second angle under investigation y. Preferably, the first angle under investigation x and the second angle under investigation y are orthogonal with regard to each other.

In addition to simulating radar targets arranged along the first angle under investigation x, the setup of FIG. 4 allows for simulating radar targets arranged along the second angle under investigation y, by selectively activating and deactivating the antenna units 40, 41, 42 and 43. Advantageously, the antenna unit 13, which is arranged between the antenna units 41 and 42 may also be used as part of the further antenna units 40, 41, 42 and 43, when simulating radar targets arranged along the second angle under investigation y.

In this embodiment, additionally, an antenna unit switch 45 is shown. The antenna unit switch 45 is connected to each one of the individual antenna units. The individual connections are omitted in this figure for reasons of clarity. The antenna unit switch 45 performs the activation and deactivation of the individual antenna units, in order to simulate the radar targets.

In addition to the two-dimensional arrangement of antenna units 10-15, 40-43, shown here, also a complete two-dimensional grid of antenna units forming pixels might be employed. In this case, a movement of simulated radar targets along the first angle under investigation and along the second angle under investigation at the same time is possible.

Although in FIG. 4, only four dedicated antenna units 40, 41, 42 and 43 arranged along the second angle under investigation y are shown, a far greater number might be employed. Especially, also here 50-150, preferably 96 antenna units may be used.

Instead of arranging the antenna units 40, 41, 42, and 43 interspaced with the antenna units 10-15, they may also be placed adjacent thereto, resulting in a modular design, in which modules of connected antenna units, are placeable as desired. One module could for example be formed by the antenna units 10-15 of FIG. 1.

Fifth Embodiment

Figure 5:
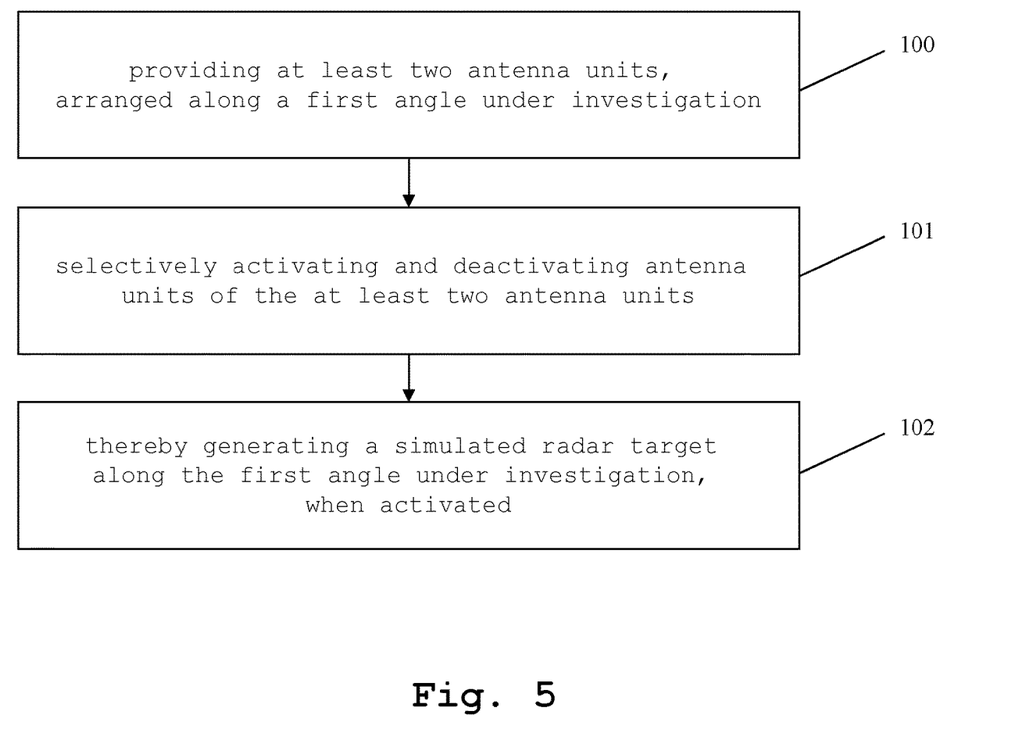
FIG. 5 shows an exemplary embodiment of the inventive method in a flow diagram.

In FIG. 5, a flow diagram of an exemplary embodiment of the inventive method is shown. In a first step 100 at least two antenna units arranged along a first angle under investigation are provided. In a second step 101, antenna units of the at least two antenna units are selectively activated and deactivated. In a third step 102, a simulated radar target is generated along the first angle under investigation by the activated antenna units of the second step 101.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a specific number of antenna units or frequency of the radar signal. The invention discussed above can be applied to many types of radar systems under test. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A radar target simulator frontend, configured to simulate at least one radar target for testing a radar device under test,
comprising at least two antenna units, arranged along a first angle under investigation, wherein each of the at least two antenna units comprises a transmission antenna and a reception antenna separate from the transmission antenna,
wherein the at least two antenna units are configured to be selectively activated and deactivated, each antenna unit of the at least two antenna units generating a simulated radar target along the first angle under investigation, when activated,
wherein the reception antenna is configured to receive the radar signal transmitted by the radar device under test,
wherein the transmission antenna is configured to transmit a simulated scatter signal, based on the radar signal transmitted by the radar device under test, received by the reception antenna, back to the radar device under test, and
wherein the radar target simulator frontend is configured to simulate a near field radar target by jointly activating at least two adjacent antenna units of the at least two antenna units.

2. The radar target simulator frontend of claim 1, wherein the transmission antenna and the reception antenna of each of the at least two antenna units are arranged with regard to each other along an angle orthogonal to the first angle under investigation.

3. The radar target simulator frontend of claim 1, wherein the transmission antenna and the reception antenna of each antenna unit are arranged at an angular distance with regard to each other, which is smaller than an angular resolution of the radar device under test.

4. The radar target simulator frontend of claim 1, wherein the at least two antenna units are configured to be activated jointly, simultaneously generating at least two simulated radar targets.

5. The radar target simulator frontend of claim 1, comprising a plurality of antenna units, arranged along the first angle under investigation, wherein the plurality of antenna units are configured to be selectively activated and deactivated, each antenna unit of the plurality of antenna units generating a simulated radar target, when activated.

6. The radar target simulator frontend of claim 5, wherein the first angle under investigation and the second angle under investigation are orthogonal with regard to each other.

7. The radar target simulator frontend of claim 1, comprising at least two further antenna units, arranged along a second angle under investigation,
wherein the at least two further antenna units are configured to be selectively activated and deactivated, each antenna unit of the at least two further antenna units generating a simulated radar target along the second angle under investigation, when activated.

8. The radar target simulator frontend of claim 1, wherein the radar target simulator frontend is configured to simulate radar targets for testing a multiple input multiple output, MIMO, radar device under test or a multiple input single output, MISO, radar device under test.

9. The radar target simulator frontend of claim 1, comprising a plurality of antenna units,
wherein the plurality of antenna units are arranged in a two-dimensional angular pattern, wherein the plurality of antenna units are configured to be selectively activated and deactivated, each antenna unit of the plurality of antenna units generating a simulated radar target at a specific two-dimensional angular position.

10. The radar target simulator frontend of claim 1, comprising an antenna unit switch, configured to selectively activate and deactivate the at least two antenna units.

11. The radar target simulator frontend of claim 10, wherein the antenna unit switch is configured to successively activate and deactivate directly adjacent antenna units of the at least two antenna units, simulating a movement of a simulated radar target.

12. A method for simulating at least one radar target for testing a radar device under test, comprising:
providing at least two antenna units, arranged along a first angle under investigation, wherein each of the at least two antenna units comprises a transmission antenna and a reception antenna separate from the transmission antenna, selectively activating and deactivating antenna units of the at least two antenna units, and thereby generating a simulated radar target along the first angle under investigation, when activated, receiving, by the reception antenna, the radar signal transmitted by the radar device under test, and transmitting, by the transmission antenna, a simulated scatter signal, based on the radar signal transmitted by the radar device under test, received by the reception antenna, back to the radar device under test, wherein the radar target simulator frontend is configured to simulate a near field radar target by jointly activating at least two adjacent antenna units of the at least two antenna units.

13. The method of claim 12, wherein many pairs of antenna units are created in an angle in order to simulate many possible angles under investigation.

14. The method of claim 13, wherein the pairs of antenna units are aligned in a specific direction in order to test radar targets along angles in the specific direction.

15. The method of claim 13, wherein the pairs of antenna units are designed to be within an angular resolution cell.

16. The method of claim 12, wherein a two-dimensional alignment of the antenna units is performed by creating pixels.

* * * * *